US007021690B2

(12) United States Patent
Crean

(10) Patent No.: US 7,021,690 B2
(45) Date of Patent: Apr. 4, 2006

(54) LOCKING MECHANISM FOR RECREATIONAL VEHICLE BAGGAGE DOOR

(75) Inventor: Johnnie R. Crean, Chino, CA (US)

(73) Assignee: Alfa Leisure, Inc., Ontario, CA (US)

( * ) Notice: Subject to any disclaimer, the term of this patent is extended or adjusted under 35 U.S.C. 154(b) by 0 days.

(21) Appl. No.: 10/936,787

(22) Filed: Sep. 8, 2004

(65) Prior Publication Data

US 2005/0140171 A1     Jun. 30, 2005

Related U.S. Application Data

(62) Division of application No. 10/205,585, filed on Jul. 24, 2002, now Pat. No. 6,793,260.

(51) Int. Cl.
*E60P 3/32* (2006.01)
*E05B 13/10* (2006.01)

(52) U.S. Cl. .................. 296/37.1; 70/239; 292/138; 292/DIG. 23

(58) Field of Classification Search .............. 296/37.1, 296/37.6, 164, 146.1; 70/237, 238, 239, 70/256; 292/138, DIG. 3, DIG. 23
See application file for complete search history.

(56) References Cited

U.S. PATENT DOCUMENTS

| 4,728,144 A | * | 3/1988 | Crean ...................... 296/168 |
| 4,746,164 A | * | 5/1988 | Crean ...................... 296/164 |
| 4,906,033 A | * | 3/1990 | Sargent et al. .............. 292/35 |
| 6,293,612 B1 | * | 9/2001 | Crean ...................... 296/175 |

OTHER PUBLICATIONS

Carefree, the World's Greatest Selection of RV Awnings, Sidewinder II, vol. 8, Issue 1, p. 19, 1997.
Brochure: Ideal from Alfa, Nov. 1996.

* cited by examiner

*Primary Examiner*—Joseph D. Pape
(74) *Attorney, Agent, or Firm*—Knobbe Martens Olson & Bear, LLP

(57) ABSTRACT

A recreational vehicle (RV) with a central actuator that controls locking and unlocking of a plurality of access doors. Each of the access doors has a locking member that is interconnected to the central actuator. Thus, the central actuator may be configured to lock or unlock selected group of doors simultaneously. The central actuator is located inside the RV, and controlling input to the central actuator may be from a remote transmitter, or by direct manipulation of the central actuator. The locking members and the central actuator may be linked mechanically, electromagnetically, hydraulically, pneumatically, or in any number of ways. The central actuator advantageously permits an RV user to lock or unlock groups or all of the access doors simultaneously while inside the RV, or by using the remote transmitter.

29 Claims, 13 Drawing Sheets

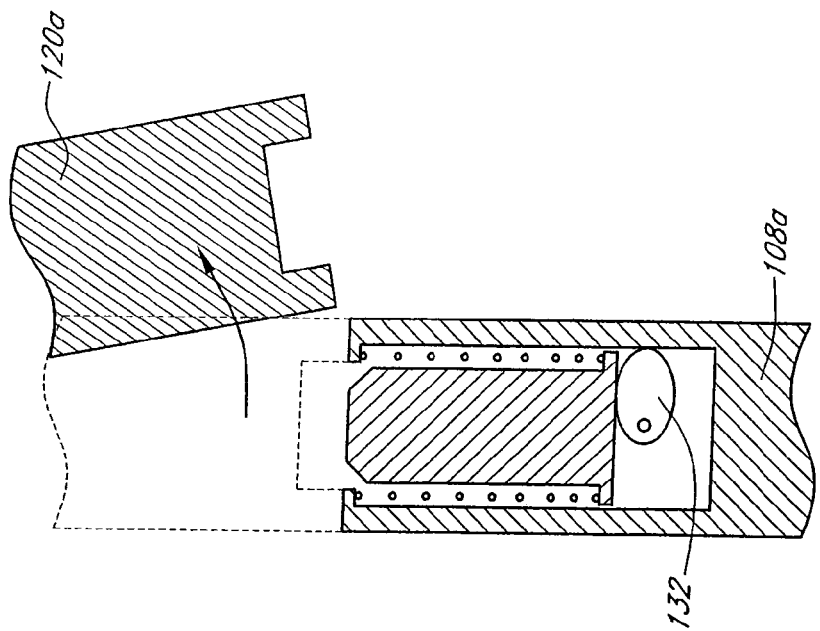
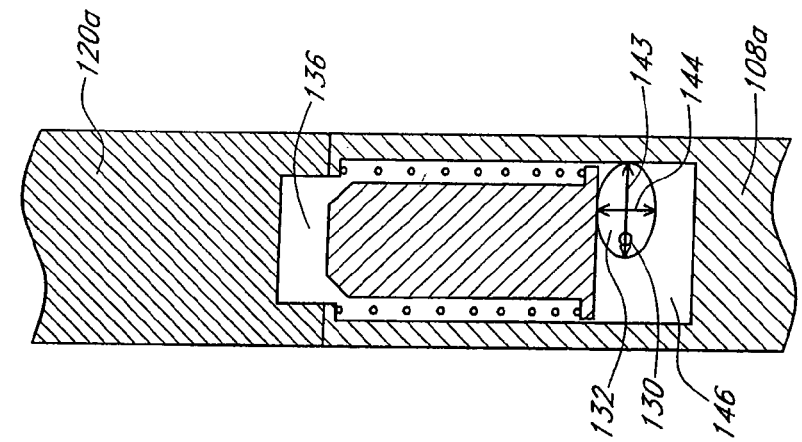
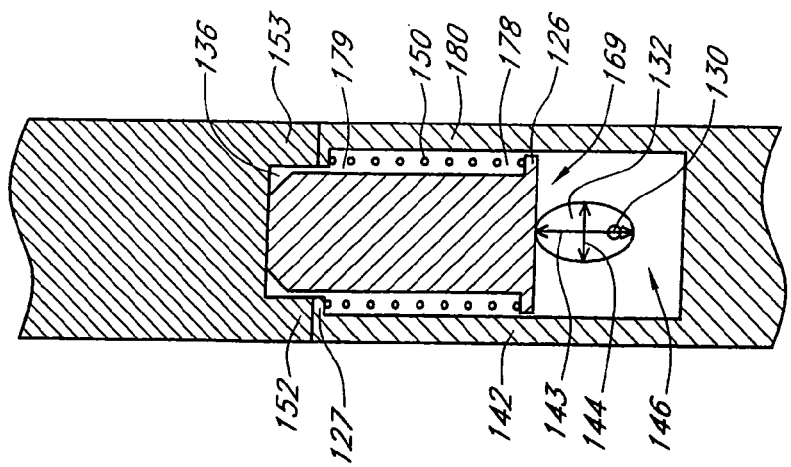
FIG. 8A
FIG. 8B
FIG. 8C

LOCKING MECHANISM FOR RECREATIONAL VEHICLE BAGGAGE DOOR

RELATED APPLICATIONS

This application is a divisional of U.S. patent application Ser. No. 10/205,585 filed Jul. 24, 2002 now U.S. Pat. No. 6,793,260, titled "Locking Mechanism for Recreational Vehicle Baggage Door."

BACKGROUND OF THE INVENTION

1. Field of the Invention

The present invention relates to recreational vehicles (RVs) and more specifically, to RV door locking mechanisms that enable multiple baggage doors to lock and unlock as a result of a single activation.

2. Description of the Related Art

Recreational vehicles (RVs) have become an increasingly popular and common means of recreation. RVs are mobile vehicles that include a living space inside and can be either self-propelled, as in a motorhome, or can depend on another vehicle for their motive power, as in a trailer such as a fifth wheel trailer. A typical RV comprises a ladder frame mounted on a plurality of wheels adapted for rolling movement across the ground. A floor is mounted atop the frame, a plurality of walls is built atop the floor, and a ceiling is built atop the plurality of walls in order to define an interior living space for the RV users.

RV users will typically use the RV to travel to a recreational area and live in the RV for some period of time. Some RV owners even use their RV as their primary residence. Thus, since an RV will often be used for extended periods of time, RV customers will usually desire storage areas where luggage, supplies, appliances, equipment, and the like can be stowed.

To address this need, RV manufactures often include hollow compartments to be used as storage areas. These storage areas are usually accessible from outside of the RV, through openings cut in the side of the storage area of the RV, and movable storage area doors usually cover these openings so that cargo will not fall out of the storage areas during travel.

Since cargo inside the storage areas is often valuable to the RV owner, the RV owner usually desires to secure the storage area from unauthorized access. To address this concern, RV manufacturers often include securing members on the storage area doors. In a typical embodiment, a RV has multiple storage area doors, and each door comprises at least one securing member. Each securing member can move between a locked position, in which the securing member fixes the storage area door in place over the openings in the storage area, and an unlocked position, in which the storage area door can be moved and the RV can access the interior of the storage area through the opening. Typically, each securing mechanism is coupled to a lock, widely known in the art, such that a key is required for moving the securing mechanism between its locked position and unlocked positions. As such, the RV user can lock the storage area to thereby prevent unauthorized access to the cargo.

When the user wants to lock or unlock the lockable storage area doors, the RV owner must perform the act on each of the lockable doors. Unfortunately, having to spend time walking around the RV locking or unlocking the lockable storage area doors prolongs an already time-consuming loading and unloading process. Also, when the RV user wants to drive the RV somewhere, it is preferable to secure every door; however, the user can easily forget to lock one of the doors. Thus, the RV user sometimes spends additional time double checking each and every lock, or sometimes, the user might drive off with the contents of the unlocked storage area compromised. Furthermore, if the storage area doors have uncommon locks, an additional problem arises; namely, each lock requires a different key, and as such, the user becomes encumbered with multiple keys and must often spend time at each lock trying multiple keys until the correct one is found. Therefore, current multi-lock designs can inconvenience the user of the RV in a number of ways.

Furthermore, the locks of the storage area doors are almost always located on the outside surface of the RV, requiring the user to get out of the RV to lock and unlock the storage area doors. This can be quite an inconvenience, especially during inclement weather because the user will be exposed to the elements or will have to spend time putting on protective gear to avoid exposure. This is also an inconvenience during the nighttime hours because the darkness often requires the user to awkwardly fumble with a flashlight and the keys as the user tries to find the locks, find the correct key, and guide the key into the lock.

Hence from the foregoing, there is an ongoing problem with current RVs in that RV users ordinarily must individually lock and unlock the storage area doors, which is exacerbated because the RV user must do so from outside the vehicle. It will be appreciated that there is need to eliminate these inconveniences.

SUMMARY OF THE INVENTION

The aforementioned needs are satisfied by one aspect of the invention relating to a recreational vehicle comprising a frame mounted on wheels adapted to be rollably moved over the ground, and a housing comprising a plurality of walls built on the frame so as to define an interior living space having a bathroom and a bedroom. The housing further defines a plurality of storage spaces each having an access opening adjacent the exterior walls of the housing. The recreational vehicle further comprises a plurality of access doors positioned adjacent the outer wall of the housing adjacent the access openings of the plurality of storage spaces. The plurality of access doors are hingeably attached to the housing so as to be movable between an open position wherein access to the storage is provided via the access opening, and a closed position wherein the storage space is secured from entry via the access opening. The recreational vehicle further comprises a locking system having a plurality of locking members and a central actuator. The plurality of locking members engage with the plurality of access doors such that the plurality of locking members in a locked configuration lock the plurality of access doors into the closed position and in an unlocked configuration permit the plurality of access doors to be moved to an open position. The central actuator is mounted within the housing and is coupled to the plurality of locking members such that controlling of the central actuator results in the plurality of locking members moving between a locked and unlocked configuration.

In one embodiment, each of the locking members comprises a strike defined by the access door and a movable bolt mounted to the housing such that in the locked configuration a portion of the bolt engages the strike so as to prevent opening of the door. In the unlocked configuration the bolt retracts from the strike so as to permit opening of the door.

In one embodiment, the movement of the bolt in the locking member is pneumatically actuated. In another embodiment, the movement of the bolt in the locking member is hydraulically actuated. In yet another embodiment, the movement of the bolt in the locking member is electromagnetically actuated. In yet another embodiment, the movement of the bolt in the locking member is mechanically actuated.

In the embodiment where the bolt is mechanically actuated, the locking member further comprises a cam that is rotatably mounted to the housing such that the cam engages the bolt. The cam being in a first orientation causes the bolt to be pushed into the strike for the locked configuration, and the cam being in a second orientation allows the bolt to retract from the strike for the unlocked configuration. The rotation of the cam is mechanically actuated.

In one embodiment, the mechanically actuated locking member further comprises a spring that couples the bolt to the housing such that the locked configuration corresponds to the spring being compressed. During transition of the locking member into the unlocked configuration, the spring member relaxes thereby facilitating the retraction of the bolt from the strike. The locking system further comprises a plurality of linkages and gears that interconnect the cam in each of the plurality of locking members to the central actuator so as to transmit mechanical output of the central actuator to the cams.

In one embodiment, the locking system further comprises a portable transmitter and a receiver wherein the receiver is connected to the central actuator. A signal transmitted by the transmitter is received by the receiver and relayed to the central actuator as the control input. One possible signal is a lock signal, and another possible signal is an unlock signal.

In one embodiment, the central actuator is configured to receive user input, and based on the user input, selectively activate one or more groups of locking members. In one possible grouping of the locking members, a first group includes a locking member for a main door, and a second group that includes locking members for the plurality of access doors.

In one embodiment, the recreational vehicle is a motorhome. In another embodiment, the recreational vehicle is a trailer. In one embodiment, the trailer is a fifth-wheel trailer.

In one embodiment, the relative orientation of the strike to the bolt is adjustable so as to accommodate misalignments. In yet another embodiment, the bolt is tapered on one side such that when engaged with the strike, the bolt urges the door in a first direction. In one configuration of the tapered bolt, the taper is on the interior side such that the bolt urges the door inward when engaged with the strike.

Another aspect of the invention relates to a recreational vehicle comprising a frame mounted on wheels adapted to be rollably moved over the ground, and a housing comprising a plurality of walls built on the frame so as to define an interior living space having a bathroom and a bedroom. The housing further defines a plurality of storage spaces each having an access opening adjacent the exterior walls of the housing. The recreational vehicle further comprises a plurality of access doors positioned adjacent the outer wall of the housing adjacent the access openings of the plurality of storage spaces. The plurality of access doors are hingeably attached to the housing so as to be movable between an open position wherein access to the storage is provided via the access opening, and a closed position wherein the storage space is secured from entry via the access opening. The plurality of access doors are logically grouped into one or more groups. The recreational vehicle further comprises a locking system having a plurality of locking members controlled by a central actuator. The plurality of locking members are grouped according to one or more logical groups of the access doors such that controlling of the central actuator results in a selected group of locking members associated with a selected group of access doors moving between a locked and unlocked configuration. The selected group of locking members engage with the selected group of access doors such that the selected group of locking members in a locked configuration lock the selected group of access doors into the closed position and in an unlocked configuration permit the selected group of access doors to be moved to an open position. The central actuator is mounted within the housing and is coupled to the one or more groups of locking members.

In one embodiment, the access doors include a main door to the interior living space, a plurality of baggage compartment doors, and one or more utility access doors. In one embodiment, all the access doors are logically grouped into a single group such that the central actuator is able to lock and unlock all the access doors simultaneously. In another embodiment, the access doors are logically grouped according to functionality of the doors. In one such possible grouping, a first group comprises the main door, a second group comprises baggage compartment doors, and a third group comprises the utility doors. In yet another embodiment, the access doors are logically grouped according to desired level of security.

In one embodiment, each of the locking members comprises a strike defined by the access door and a movable bolt mounted to the housing such that in the locked configuration a portion of the bolt engages the strike so as to prevent opening of the door. In the unlocked configuration the bolt retracts from the strike so as to permit opening of the door.

In one embodiment, the movement of the bolt in the locking member is pneumatically actuated. In another embodiment, the movement of the bolt in the locking member is hydraulically actuated. In yet another embodiment, the movement of the bolt in the locking member is electromagnetically actuated. In yet another embodiment, the movement of the bolt in the locking member is mechanically actuated.

In the embodiment where the bolt is mechanically actuated, the locking member further comprises a cam that is rotatably mounted to the housing such that the cam engages the bolt. The cam being in a first orientation causes the bolt to be pushed into the strike for the locked configuration, and the cam being in a second orientation allows the bolt to retract from the strike for the unlocked configuration. The rotation of the cam is mechanically actuated.

In one embodiment, the mechanically actuated locking member further comprises a spring that couples the bolt to the housing such that the locked configuration corresponds to the spring being compressed. During transition of the locking member into the unlocked configuration, the spring member relaxes thereby facilitating the retraction of the bolt from the strike. The locking system further comprises a plurality of linkages and gears that interconnect the cam in each of the plurality of locking members to the central actuator so as to transmit mechanical output of the central actuator to the cams.

In one embodiment, the locking system further comprises a portable transmitter and a receiver wherein the receiver is connected to the central actuator. A signal transmitted by the transmitter is received by the receiver and relayed to the central actuator as the control input. One possible signal is a lock signal, and another possible signal is an unlock signal.

In one embodiment, the recreational vehicle is a motorhome. In another embodiment, the recreational vehicle is a trailer. In one embodiment, the trailer is a fifth-wheel trailer.

In one embodiment, the relative orientation of the strike to the bolt is adjustable so as to accommodate misalignments. In yet another embodiment, the bolt is tapered on one side such that when engaged with the strike, the bolt urges the door in a first direction. In one configuration of the tapered bolt, the taper is on the interior side such that the bolt urges the door inward when engaged with the strike.

BRIEF DESCRIPTION OF THE DRAWINGS

FIG. 5A, FIG. 5B, and FIG. 5C are cross sectional views of components of the locking mechanism taken from FIG. 4 along the lines 5A—5A, 5B—5B, and 5C—5C respectively, wherein FIG. 5A shows the locking mechanism in a locked configuration, FIG. 5B shows the locking mechanism in an unlocked configuration, and FIG. 5C shows the storage area door opened;

FIG. 8A, FIG. 8B, and FIG. 8C are cross sectional views of components of the locking mechanism taken from FIG. 6 along the lines 8A—8A, 8B—8B, and 8C—8C respectively, wherein FIG. 8A shows the locking mechanism in a locked configuration, FIG. 8B shows the locking mechanism in an unlocked configuration, and FIG. 8C shows the storage area door opened;

DETAILED DESCRIPTION OF THE PREFERRED EMBODIMENT

Figure 1A:
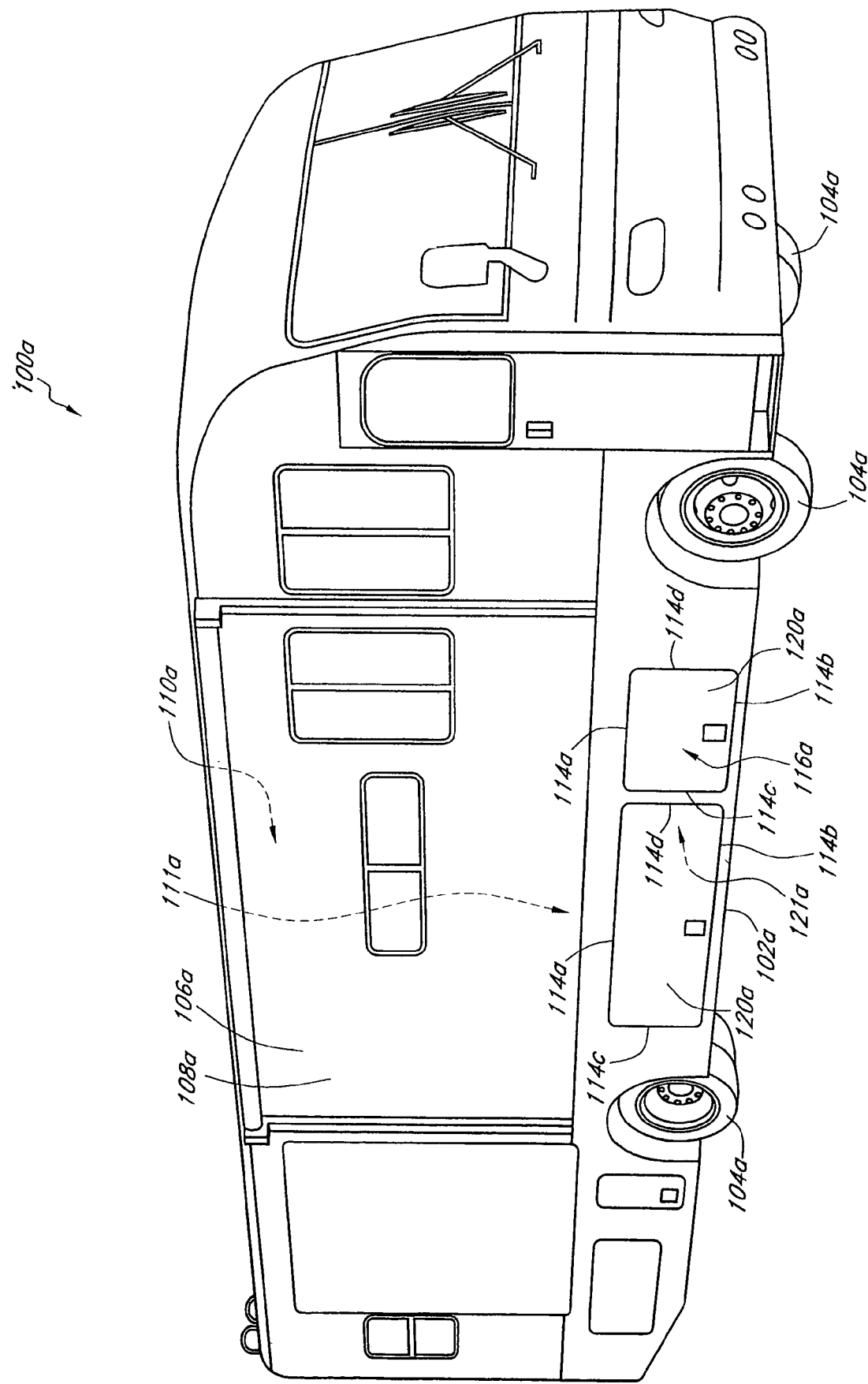
FIG. 1A is a perspective view of an RV comprising a motorhome suitable for practicing one embodiment of the present invention.

References will now be made to the drawings wherein like numerals refer to like parts throughout. FIG. 1A illustrates one embodiment of a recreational vehicle (RV) 100a comprising a motorhome having a frame 102a attached to a plurality of wheels 104a so as to permit rolling movement of the RV 100a over the ground. As is also shown in FIG. 1A, a main housing 106a is mounted above the frame 102a and is essentially formed of a plurality of planar walls 108a that are joined together and mounted to the frame 102a in a well known manner so as to define an inner living space 110a having a floor 111a.

Furthermore, below the plane of the floor 111a of the RV 100a, a plurality of planar members (not shown) are interconnected so as to define a plurality of storage areas 121a, which are essentially hollow cavities. In one embodiment, the storage areas 121a are substantially enclosed, but an opening 116a is formed in the walls 108a of the RV 100a adjacent to the storage area 121a. The opening 116a provides the primary path of access into and out of the storage area 121a.

Also, the RV 100a additionally comprises a plurality of storage area doors 120a. In one embodiment, the typical storage area door 120a is planar and rectangular so as to define a top edge 114a, a bottom edge 114b, a back edge 114c, and a front edge 114d. In one embodiment, the top edge 114a of each individual storage area door 120a is hingedly attached to the walls 108a over the respective opening 116a. As such, the storage area door 120a is able to pivot between a closed and an open position. As shown in FIG. 1A, when the storage area door 120a is in the closed position, the storage area door 120a lies approximately flush with the walls 108a of the RV 100a so as to substantially cover the opening 116a, thereby preventing cargo from falling out of the storage area 121a inadvertently. When the storage area door 120a is in the open position (not shown), the storage area door 120a extends out from the walls 108a so as to expose the opening 116a and allow the user of the RV 100a to load and unload the storage area 121a.

As will be described in greater detail below, the RV 100a also comprises a securing mechanism for locking the storage area doors 121a while the storage area doors 121 are in the closed position. This securing mechanism allows the user to lock and unlock multiple storage area doors 121a with one activation.

Figure 1B:
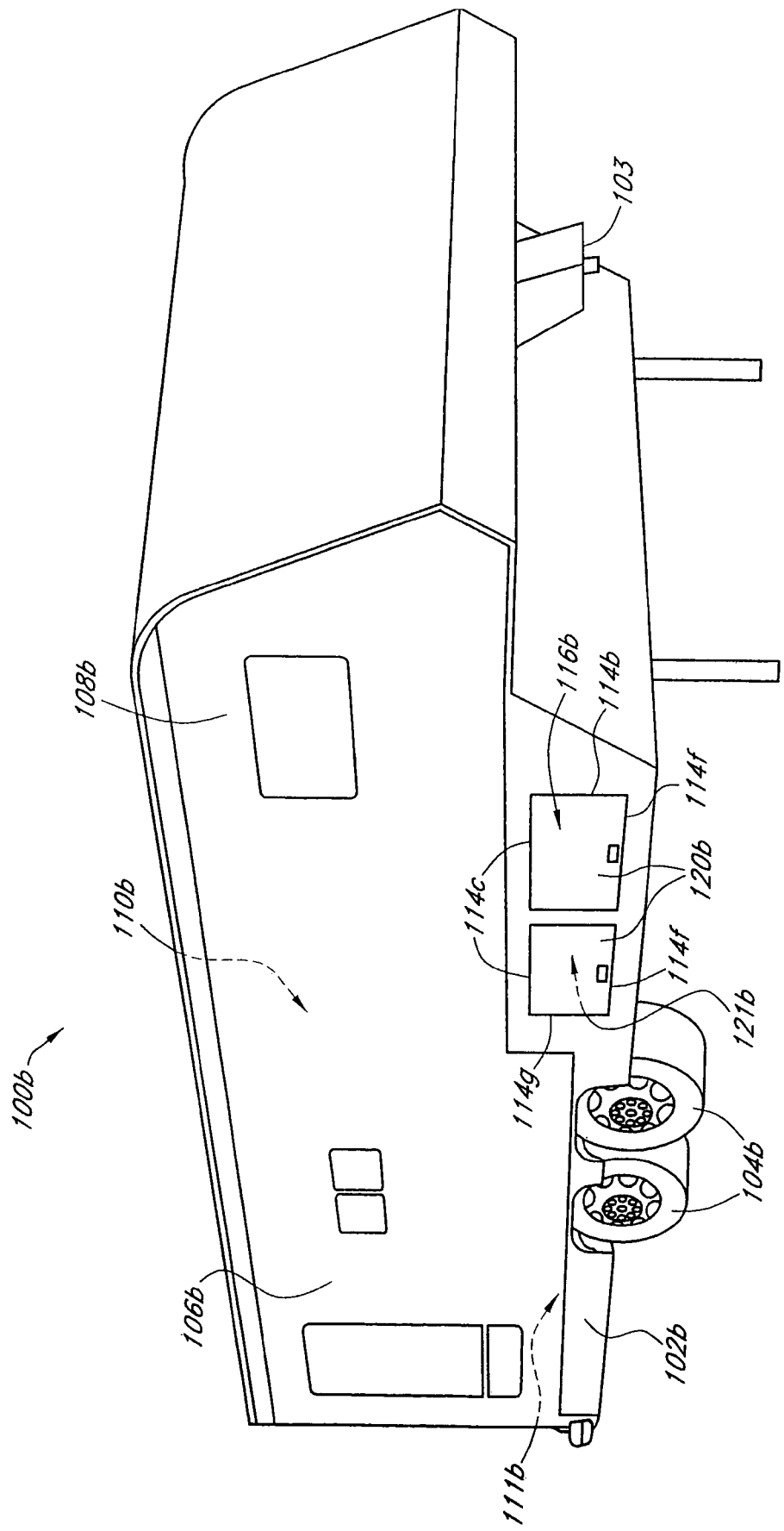
FIG. 1B is a perspective view of an RV comprising a fifth wheel trailer suitable for practicing another embodiment of the present invention.

FIG. 1B illustrates another embodiment of a RV 100b comprising a fifth wheel trailer having a frame 102b, a plurality of wheels 104b, a main housing 106b comprising walls 108b, an inner living space 110b, a floor 111b, storage areas 121b, openings 116b, and storage area doors 120b very similar to the RV 100a described above in relation to FIG. 1A. However, this RV 100b comprises a male hitch assembly 103 at the front of the RV 100b designed to couple with a known female hitch assembly of a towing vehicle so that the RV 100b can be towed by the towing vehicle. As will be described in greater detail below, the RV 100b also comprises a securing mechanism for locking the storage area doors 121b while the storage area doors 121b are in the closed position. This securing mechanism allows the user to lock and unlock multiple storage area doors 121b with one activation.

Figure 1C:
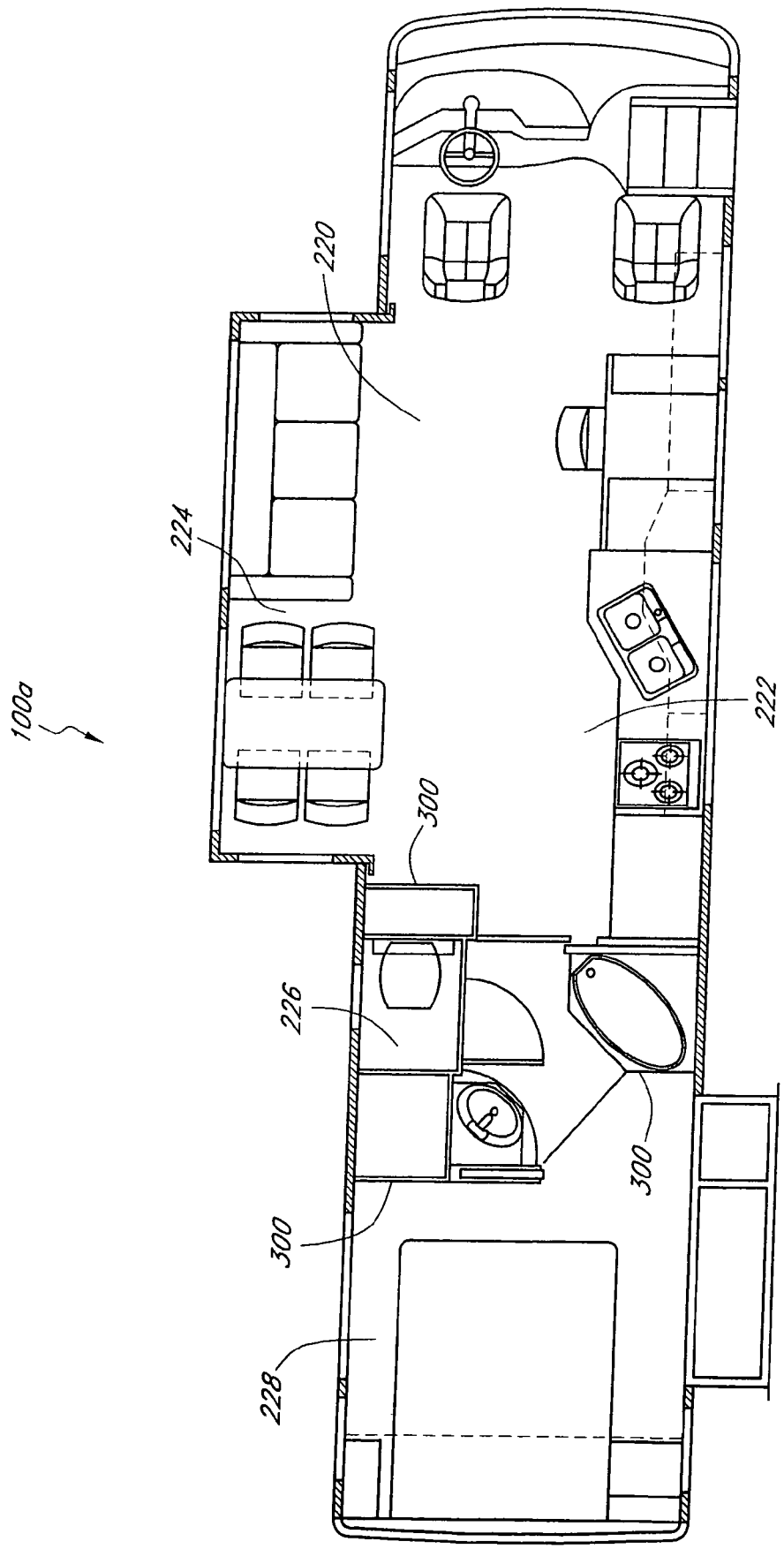
FIG. 1C illustrates an exemplary floor plan of an RV such as the motorhome of FIG. 1A.

FIG. 1C illustrates an exemplary floor plan of the RV 10a described above in reference to FIG. 1A. The housing of the RV 110a defines an interior living space that includes a living room 220, a galley 222, a dining room 224, a bathroom 226, and a bedroom 228. The housing further comprises a plurality of walls 300 that define some of the aforementioned rooms. Thus, the rooms and amenities as exemplified in FIG. 1C generally facilitate a comfortable living condition for the user(s) while providing mobility. It will be appreciated that the interior living space of the RV may be configured in any number of possible configurations without departing from the spirit of the invention disclosed herein.

Hereinbelow, the present invention will be discussed as incorporated into a RV 100a comprising a motorhome. However, it is understood that the present invention could be incorporated into other forms of RVs, such as towable trailers including the fifth wheel trailer without departing from the spirit of the invention.

Figure 2:
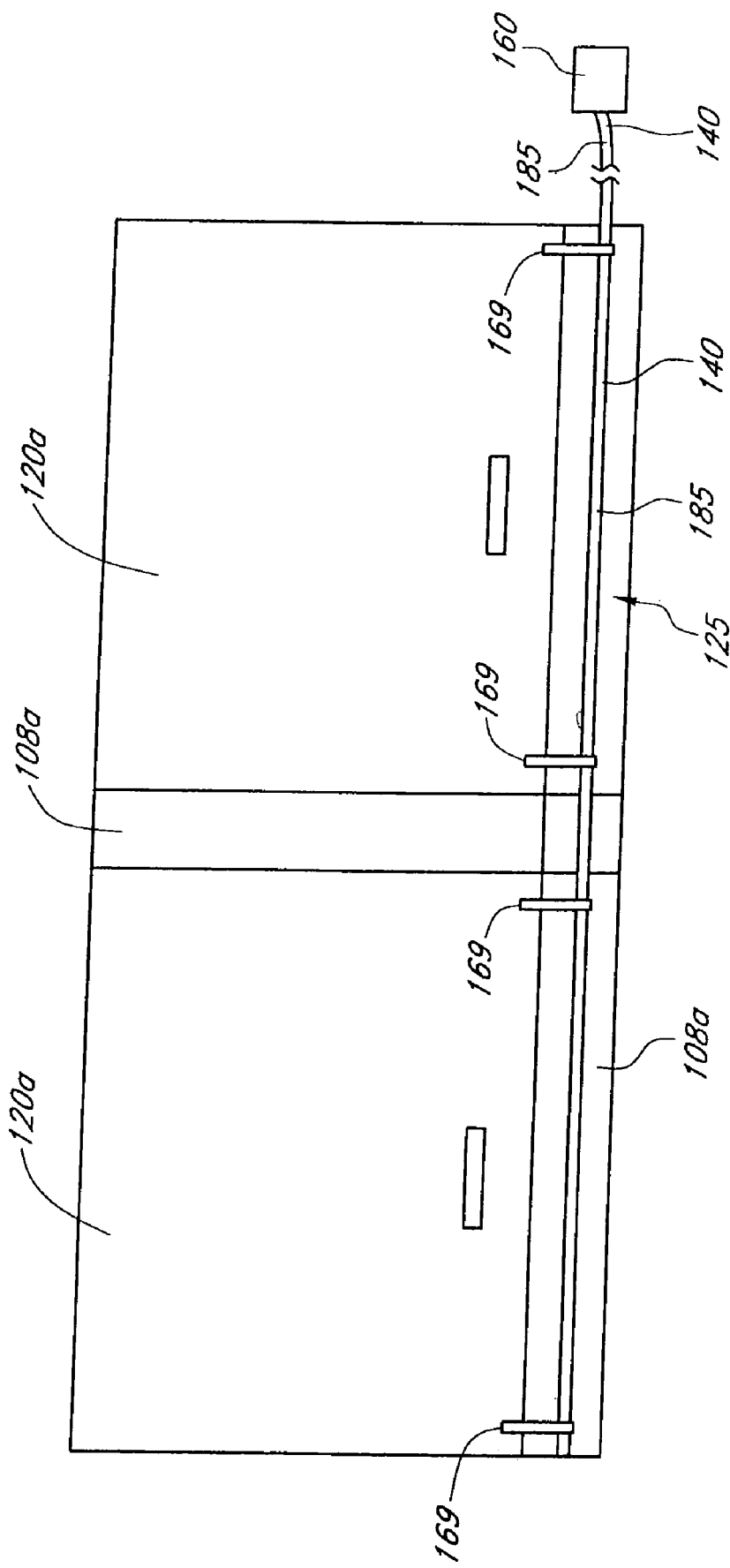
FIG. 2 is a schematic view of one embodiment of a locking mechanism coupled to a plurality of storage area doors.

Turning now to FIG. 2, a schematic illustration of a locking mechanism 125 is illustrated coupled to a portion of the storage area doors 120a as well as a portion of the walls 108a of the RV 100a. As shown, the locking mechanism 125 comprises a plurality of securing members 169 coupled to the storage area doors 120a as well as the walls 108a of the RV 100a. Preferably, there is at least one securing member 169 coupled to each storage area door 120a, but in some embodiments, there are multiple securing members 169 coupled to each individual door 120a. As will be described in more detail below, the securing members 169 can shift between a locked configuration and an unlocked configuration. When the securing members 169 are in the unlocked configuration, the storage area doors 120a can be moved between their open and closed positions. However, when the securing members 169 are in the locked configuration, the storage area doors 169 cannot shift from their closed positions.

The locking mechanism 125 also comprises an input system 140, which delivers signals to the securing members 169 to ultimately shift the securing members 169 between their respective locked and unlocked configurations. In the embodiment shown in FIG. 2, the input system 140 comprises a central actuator 160 with which the user generates the locking and unlocking signals to be sent to the plurality of securing members 169. The input system 140 also comprises a transmission member 185, which is able to carry the signal from the central actuator 160 to the plurality of securing members 169 to ultimately lock and unlock the plurality of securing members 169. As will be described in greater detail below, the activation signals can include electrical, pneumatic, hydraulic, or even mechanical signals without departing from the spirit of the invention.

As such, the locking mechanism 125 allows a user to lock and unlock multiple storage area doors 120a with one activation input. Advantageously, this feature is a convenience for the user of the RV 100a because it eliminates the inconvenience associated with having to lock and unlock each individual storage area door 120a.

Figure 3:
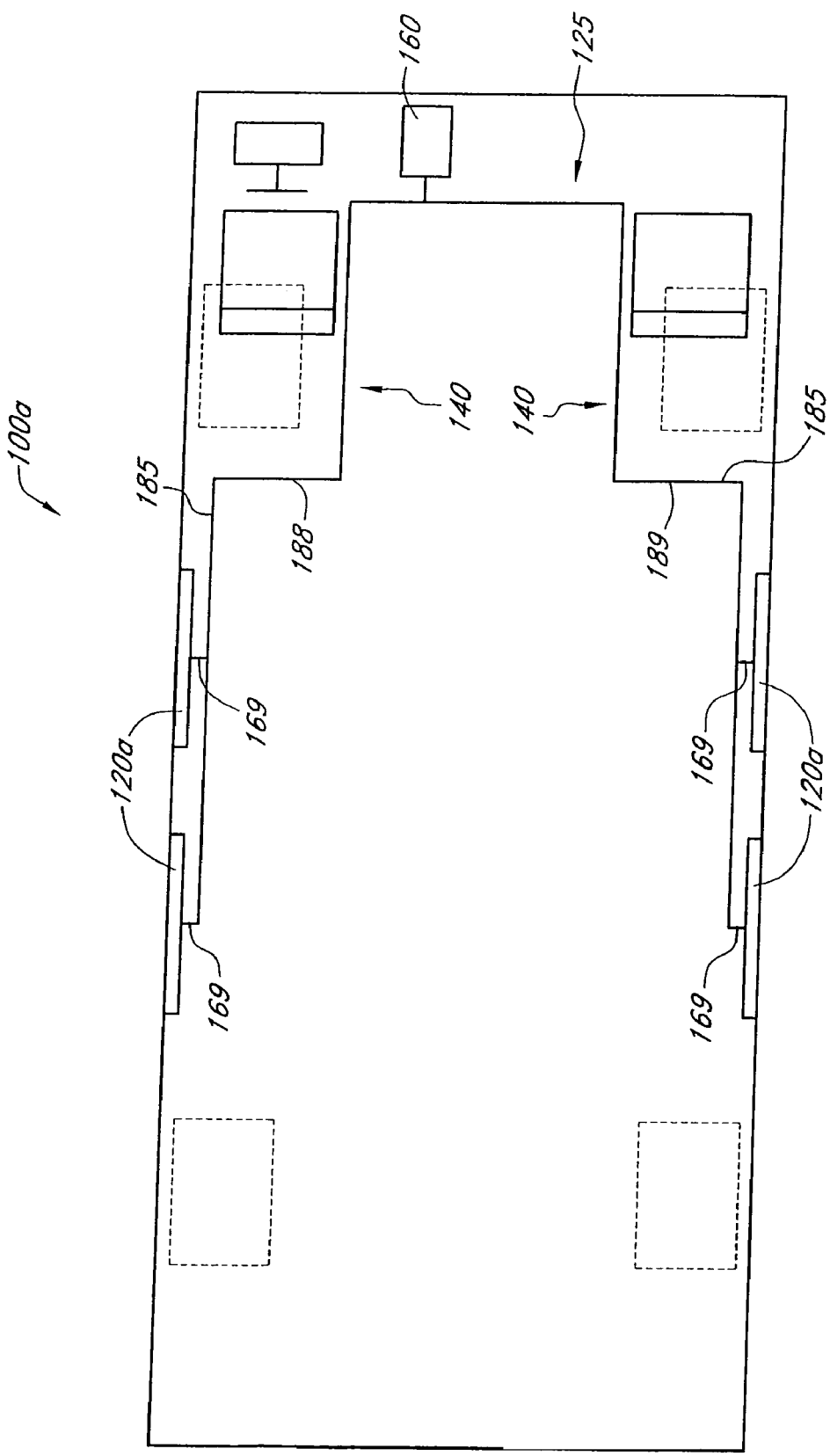
FIG. 3 is a top view of a motorhome comprising an RV illustrating another embodiment of the locking mechanism wherein components are arranged on two sides of the motorhome.

FIG. 3 is a schematic top view of the RV 100a comprising a motorhome, wherein the RV 100a has storage area doors 120a on both the driver and passenger side of the RV 100a. Also, components of the locking mechanism 125 are positioned on both sides of the RV 100a. In this embodiment, the input system 140 is coupled to the plurality of securing members 169 with a first transmission member branch 188, which extends to the securing members 169 on the driver's side of the RV 100a, and a second transmission member branch 189, which extends to the securing members 169 on the passenger's side of the RV 100. In this embodiment, the first and second transmission member branches 188, 189 are joined at the central actuator 160. As such, the locking mechanism 125 allows for the locking and unlocking of multiple storage area doors 120a through one activation, even when storage area doors 120a are positioned on multiple sides of the RV 100a. Therefore, the RV 100a can comprise additional storage area doors 120a located in a plurality of locations without departing from the spirit of the invention.

In still other embodiments, the locking mechanism 125 comprises additional securing members 169 coupled to doors other than the storage area doors 120a. For instance, in some embodiments, the locking mechanism 125 is coupled to main entranceway doors, closet doors, cupboard doors and the like. As such, the user can lock or unlock this multitude of securing mechanisms 169 with a single activation to advantageously make the RV 100a more convenient for the user.

Figure 4:
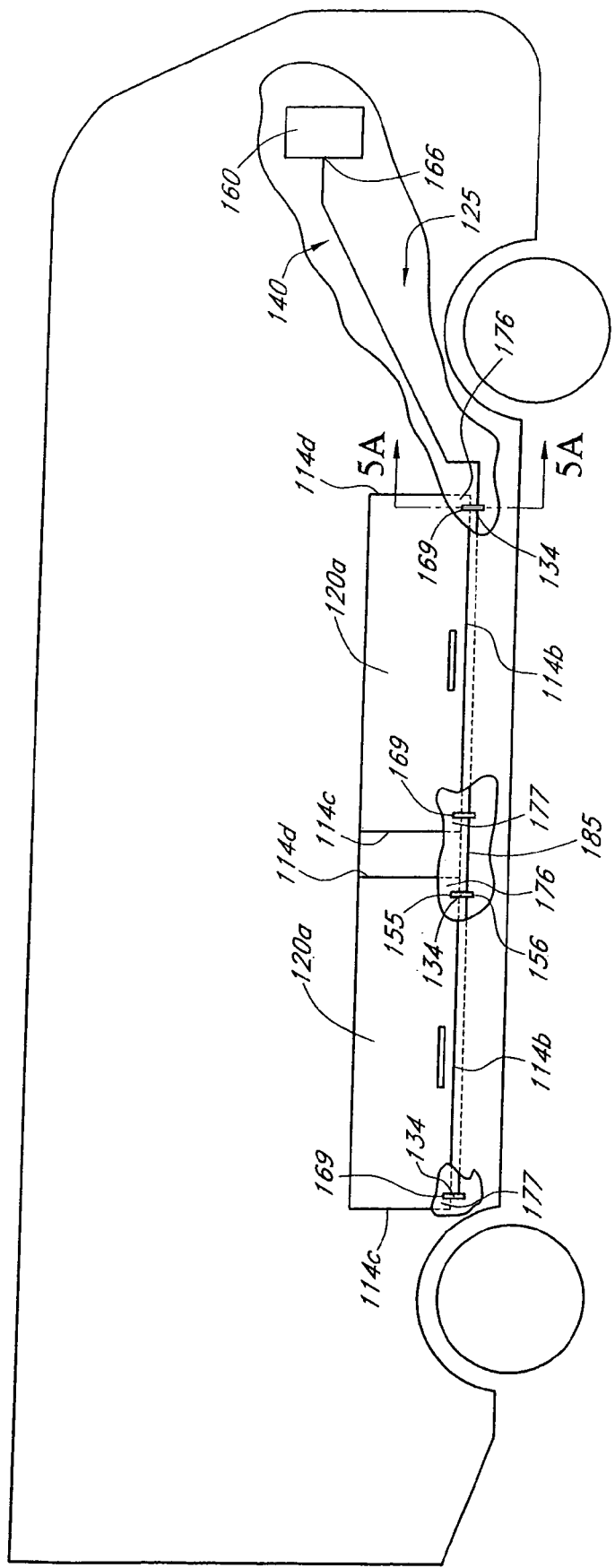
FIG. 4 is a side view of a RV comprising a motorhome, which illustrates internal components of another embodiment of a locking mechanism.

FIG. 4 illustrates a more specific embodiment of the locking mechanism 125 comprising an input system 140 and four securing members 169. As will be discussed in greater detail below, this embodiment can comprise electrical, hydraulic, or pneumatic subcomponents or a combination thereof.

In this embodiment, the typical securing mechanism 169 generally comprises a bolt 134. In the embodiment shown, the bolt 134 is a solid, cylindrical member, defining a top end 155 and a bottom end 156. In one embodiment, the bolt 134 is metallic and the top end 155 is chamfered. As will be discussed in greater detail below, the bolt 134 is mounted within the walls 108a of the RV 100a directly below the storage area doors 120a. In a typical storage area door 120a, one bolt 134 is mounted adjacent to a first lower corner 176 of the storage area door 120a, where the bottom edge 114b and front edge 114d of the storage area door 120a meet. Also, another bolt 134 is mounted adjacent to a second lower corner 177 of the storage area door 120a, where the bottom edge 114b and back edge 114c of the storage area door 120a meet.

As will be described in more detail below, the bolts 134 are able to shift between a locked and an unlocked configuration. The locking mechanism 125 enables multiple bolts 134 of multiple storage area doors 120a to shift between their respective locked and unlocked configurations to advantageously allow the user to lock or unlock multiple storage area doors 120a with a single activation.

As illustrated in FIG. 4, the locking mechanism 125 also comprises the input system 140. In one embodiment, the input system 140 generally comprises a plurality of electrical components such as conductive wires, resistors, capacitors and the like such that an electrical signal may be generated and be passed to the securing members 169. In another embodiment, the input system 140 comprises a plurality of valves, tubes, pumps, and the like such that a hydraulic or pneumatic signal may be generated and be passed to the securing members 169. In still another embodiment described in greater detail below, the input system 140 comprises mechanical members that allow a mechanical signal to pass to the securing members 169 (i.e. the mechanical members move to thereby move the securing members 169). This electrical, hydraulic, pneumatic, or mechanical signal ultimately moves the securing members 169 between their respective locked and unlocked configurations.

More particularly, the input system 140 comprises the central actuator 160 mentioned above in relation to FIG. 2 and FIG. 3. The central actuator 160 comprises a plurality of components that can be physically manipulated by the user, such as buttons, knobs, and the like, and the central actuator 160 translates physical manipulation of these components into the electrical, hydraulic, pneumatic, or mechanical signal.

That signal is then passed from the central actuator 160 to the securing members 169 through the transmission member 185. The transmission member 185 preferably is routed within the walls 108a of the RV 100a so that it is out of sight and it is unlikely to be hazardous to the user of the RV 100a. The transmission member 185 is also attached to the bottom ends 156 of the plurality of bolts 134 in a manner such that the electrical, hydraulic, pneumatic, or mechanical signal can be communicated to the bolt 134. Once a bolt 134 receives this signal, the bolt 134 moves between either its locked or unlocked configuration as will be described in greater detail below.

Figure 5C:
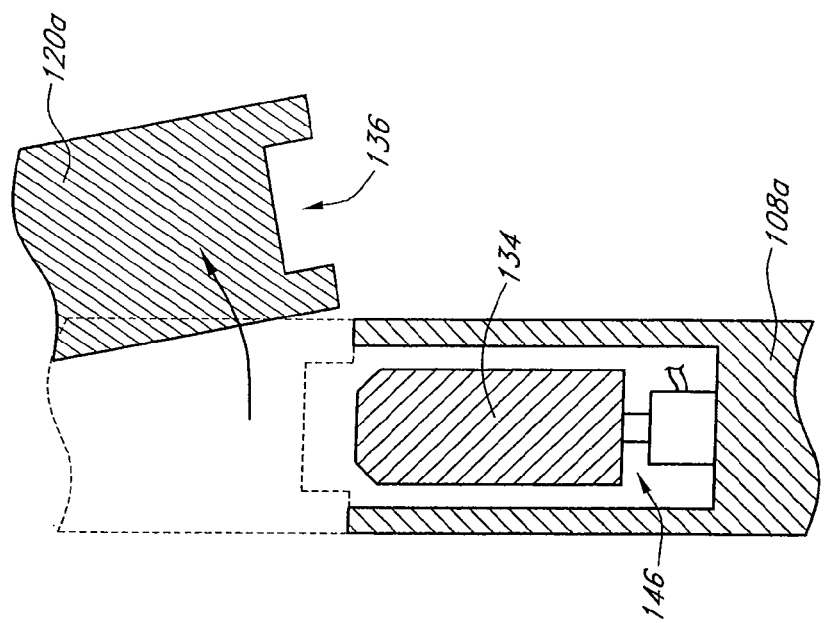
Figure 5B:
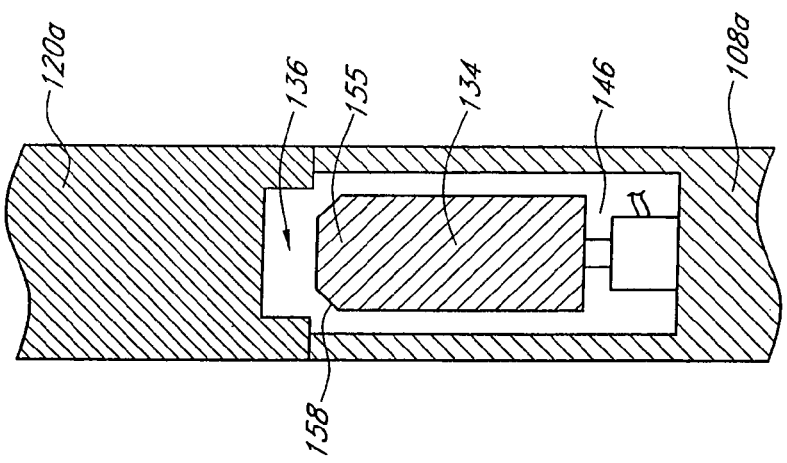
Figure 5A:
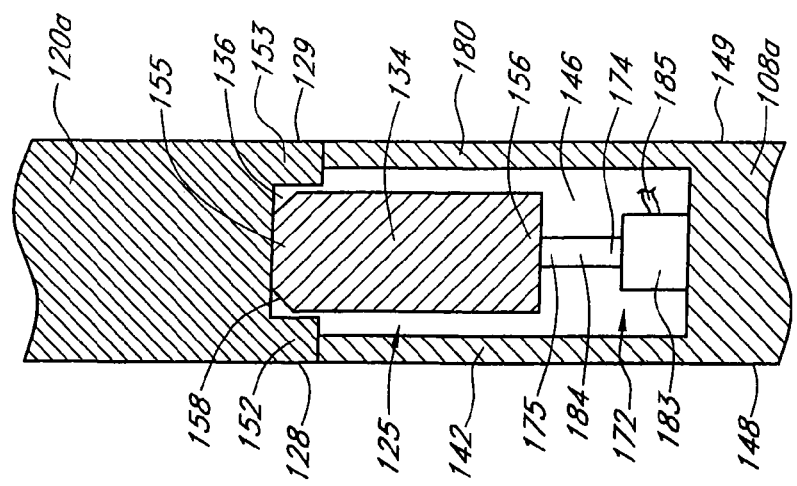

FIG. 5A, FIG. 5B, and FIG. 5C illustrate the components of the locking mechanism 125 and their function in more detail. The wall 108a comprises a first flange 142 on an internal side 148 of the wall 108a and a second flange 180 on an external side 149 of the wall 108a such that the first and second flanges 142, 180 and the portion of the wall 108a lying therebetween combine to define a channel 146. As shown, many components of the locking mechanism 125 reside inside the channel 146.

Furthermore, as shown in FIG. 5A, FIG. 5B, and FIG. 5C, the storage area door 120a comprises a first flange 152 located on an internal side 128 of the storage area door 120a and a second flange 153 located on an external side 129 of the storage area door 120a. As such, the first and second flange 152, 153 and the storage area door 120a lying therebetween combine to define a strike 136. As shown in FIG. 5A, a portion of the bolt 134 extends above the wall 108a and extends into the strike 136 when the bolt 134 is in the locked configuration as will be described in greater detail below.

In one embodiment, the transmission member 185 is connected to the bolt 134 with a connecting member 172. In this embodiment, the connecting member 172 comprises a base 183, which is rigidly attached to the wall 108a. Also, the connecting member 172 comprises a piston 184, which is slidably attached to the base 183 on a lower end 174, and is rigidly attached to the bottom end 156 of the bolt 134 on an upper end 175. As such, the base 183 of the connecting member 172 receives signals coming through the transmission member 185. Then, the base 183 translates that signal into movement of a piston 184 upward or downward.

For example, in one embodiment, the base 183 comprises an electromagnetic actuator such that when the base 183 receives a first electronic signal from the transmission member 185, the components of the electromagnetic actuator engage to slide the piston 184 upward and away from the base 183. Conversely, when the base 183 receives a second electronic signal from the transmission member 185, the components of the electromagnetic actuator engage to slide the piston 184 downward and toward the base 183.

In another embodiment, a hydraulic or pneumatic fluid moves into the base 183, causing the piston 184 to slide upward and away from the base 183. Conversely, when a hydraulic or pneumatic fluid moves out of the base, the components of the base 183 cause the piston to slide downward and toward the base 183.

Since the piston 184 is rigidly attached to the bolt 134, the bolt 134 moves in unison with the piston 184. Ultimately, this movement results in the shifting of the bolt 134 between its locked and unlocked configurations as will be discussed in greater detail below.

In the embodiment shown, the bolt 134 comprises a cylindrical member, rigidly attached to the piston 184 so that the vertical movement of the piston 184 causes vertical movement of the bolt 134. At its highest point, the bolt 134 partially enters the strike 136 as shown in FIG. 5A. As such, the storage area door 120a cannot be opened because the bolt 134 interferes with the flange 142 as the storage area door 120a pivots open. This is known as the locked configuration of the bolt 134. Conversely, at its lowest point, the bolt 134 lies outside the strike 136 as shown in FIG. 5B and FIG. 5C. As such, the storage area door 120a can be opened because the bolt 134 does not interfere with the pivoting of the storage area door 120a. This is known as the unlocked configuration of the storage area door 120a.

In the embodiment shown in FIG. 5A, FIG. 5B, and FIG. 5C, the top end 155 of the bolt 134 defines a self-seating surface 158. In one embodiment, the self-seating surface 158 extends around the circumference of the cylindrical top end 155 and the angle of the self-seating surface with respect to the plane of the top end 155 is approximately forty-five degrees. In one embodiment, the self-seating surface 158 is formed with a chamfering process known widely in the manufacturing arts. When the bolt 134 is moving from its unlocked configuration to its locked configuration and the strike 136 is off-center with respect to the bolt 134, the self-seating surface 158 might contact the flanges 152a, 152b. This contact shifts the storage area door 120a slightly, thereby centering the strike 136 with respect to the bolt 134. Advantageously, the bolt 134 is more likely to seat directly into the strike 136 to thereby lock the storage area door 120a more securely.

It is understood that the securing members 169 shown in FIG. 5A, FIG. 5B, and FIG. 5C are typical of all of the securing members 169 included in this embodiment of the locking mechanism 125. Thus, it is understood that all of the securing members 169 function in substantially the same manner. As stated, the transmission members 185 are coupled to the bases 183 of these securing members 169, and the transmission members 185 are also coupled to the central actuator 160. As such, an input supplied to the central actuator 160 will be sent through the transmission members 185 to the plurality of securing members 169, and the securing members 169 will preferably shift between their respective locked and unlocked configurations as a result of the input sent from the central actuator 160.

Thus, the user is able to shift multiple bolts 134 on multiple storage area doors 120a (i.e. secure or release multiple storage area doors 120a) with a single activation. This feature is very convenient for the user of the RV 100a because it eliminates the inconvenience associated with having to lock and unlock each individual storage area door 120a. This advantageously limits the amount of time necessary for loading and unloading the RV 100a and also limits the user's exposure to the elements in the event of loading or unloading in inclement weather. Also, this feature is convenient because the user does not become encumbered with multiple keys previously necessary for some multi-lock RV 100a designs. Furthermore, the user can easily activate the locking mechanism 125 to secure the storage area doors 120a and drive away in the RV 100a confident that the storage area doors 120a are secured, whereas with previous designs, the user would either spend additional time checking each storage area door 120a or drive off unsure of the security of the storage area doors 120a.

It should also be noted that in one embodiment, the central actuator 160 is positioned within the internal living space 110a of the RV 100a. For instance, the central actuator 160 is mounted in the dashboard (not shown) of the RV 100a in one embodiment. Positioning the central actuator 160 within the internal living space 110a allows the user to lock and unlock the storage area doors 120a without having to leave the internal living space 110a of the RV. Thus, when the user wants to lock the storage area doors 120a and there is inclement weather outside the RV 100a, the user can advantageously lock the storage area doors 120a without exposing themselves to the inclement weather. Advantageously, this embodiment also facilitates locking and unlocking of the storage area doors 120a in the dark because the central actuator 160 can be more easily seen by internal lighting of the RV 100a.

Figure 6:
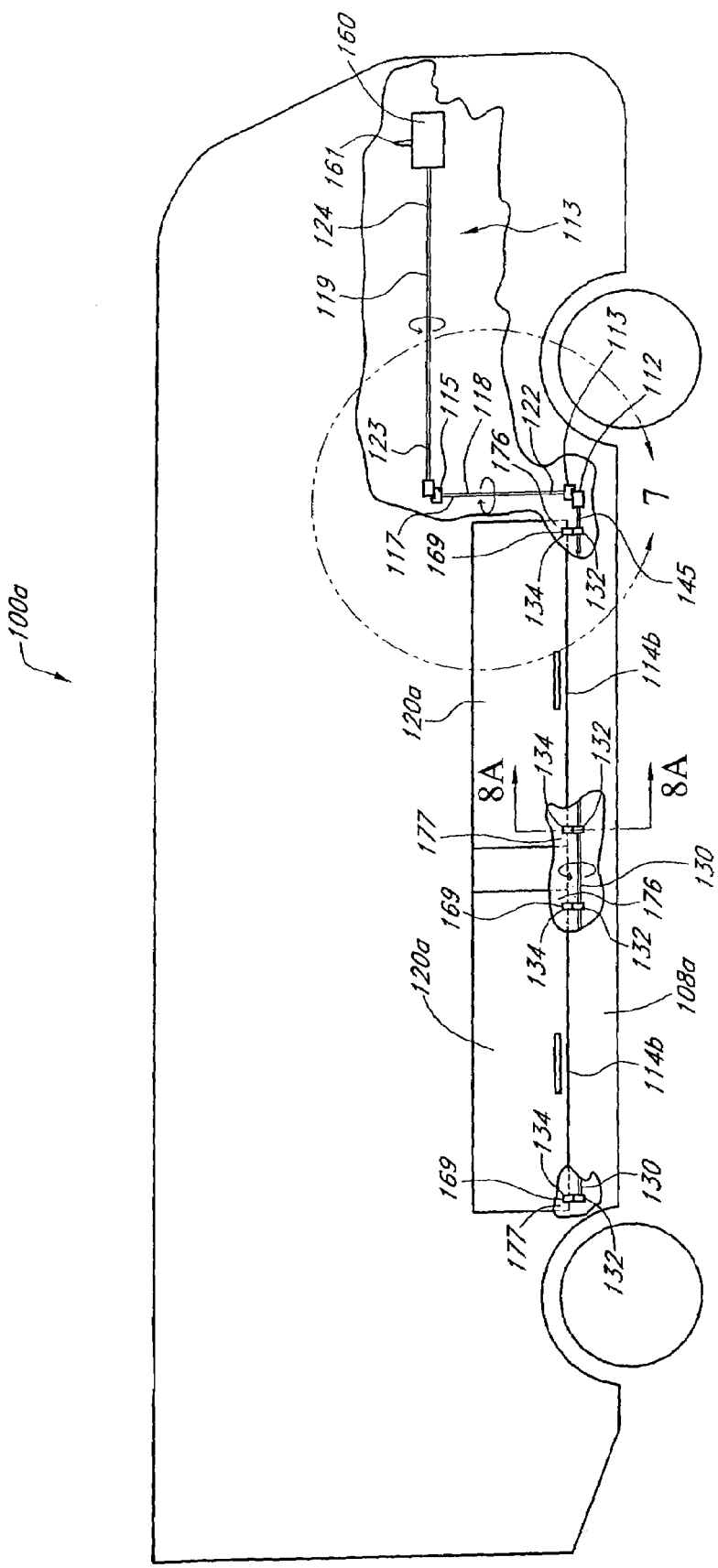
FIG. 6 is a side view of a RV comprising a motorhome, which illustrates internal components of another embodiment of a locking mechanism.

Turning now to FIG. 6, an illustration of a different embodiment of the locking mechanism 125 is shown incorporated into a RV 100a. As will be described in more detail below, the embodiment shown in FIG. 6 comprises primarily mechanical subcomponents. Similar to the aforementioned embodiment shown in FIG. 4 through FIG. 5C, this embodiment of the locking mechanism 125 comprises a plurality of securing members 169 coupled to a plurality of storage area doors 120a, and the locking mechanism 125 also comprises an input system 140 coupled to the securing members 169.

In this embodiment, the individual securing members 169 each comprise a bolt 134, which is substantially similar to the bolts 134 described above in relation to the embodiment shown in FIG. 4, FIG. 5A, FIG. 5B, and FIG. 5C. The bolts 134 in this embodiment are able to shift between a locked configuration and an unlocked configuration in a manner to be described in greater detail below.

The input system 140 of this embodiment comprises a plurality of cams 132, which are oblong pieces pivotally attached to other members of the input system 140 underneath an individual bolt 134. When pivoted in one orientation, a typical cam 132 causes its associated bolt 134 to move into its locked configuration. When pivoted in another orientation, the cam 132 causes the bolt 134 to move into its unlocked configuration as will be described in greater detail below.

The input system 140 also comprises a pivot rod 130. In one embodiment, the pivot rod 130 is a long, cylindrical member with a relatively small diameter having a first end 145. The pivot rod 130 is positioned underneath the storage area doors 120a and is rigidly attached to the plurality of cams 132 at their respective locations under the plurality of bolts 134. As will be described in greater detail below, rotation of the pivot rod 130 causes rotation of the cams 132, which ultimately results in the movement of the bolts 134 between their respective locked and unlocked configurations.

As shown in FIG. 6, the input system 140 also comprises a first linkage 118, and a second linkage 119. Both the first and second linkages 118, 119 are primarily long, cylindrical members with relatively small diameters. As will be described in greater detail below, the first and second linkages 118, 119 are interlocked together and are connected to the pivot rod 130 such that the rotation of the first and second linkages 118, 119 causes the pivot rod 130 (and therefore the cams 132) to rotate. Rotation of the cams 132 ultimately causes the bolts 134 to move between their locked and unlocked configurations.

In the embodiment shown in FIG. 6, the input system further comprises the central actuator 160 described above, and the central actuator 160 is coupled to the second linkage 119. In one embodiment, the central actuator comprises a lever 161, a rod-like member that is able to pivot over a certain range of rotation. When the user of the RV 100a pivots the lever 161 in one direction, the second linkage 119, the first linkage 118, the pivot rod 130, and the cams 132 rotate in one direction to move the plurality of bolts 134 in one direction. When the user of the RV 100a pivots the lever 161 in the opposite direction, the second linkage 119, the first linkage 118, the pivot rod 130, and the cams 132 rotate in the opposite direction to move the plurality of bolts 134 in the opposite direction. As such, the locking mechanism 125 allows the user of the RV 100a to advantageously lock or unlock multiple storage area doors with a single activation in a manner to be discussed in greater detail below.

Figure 7:
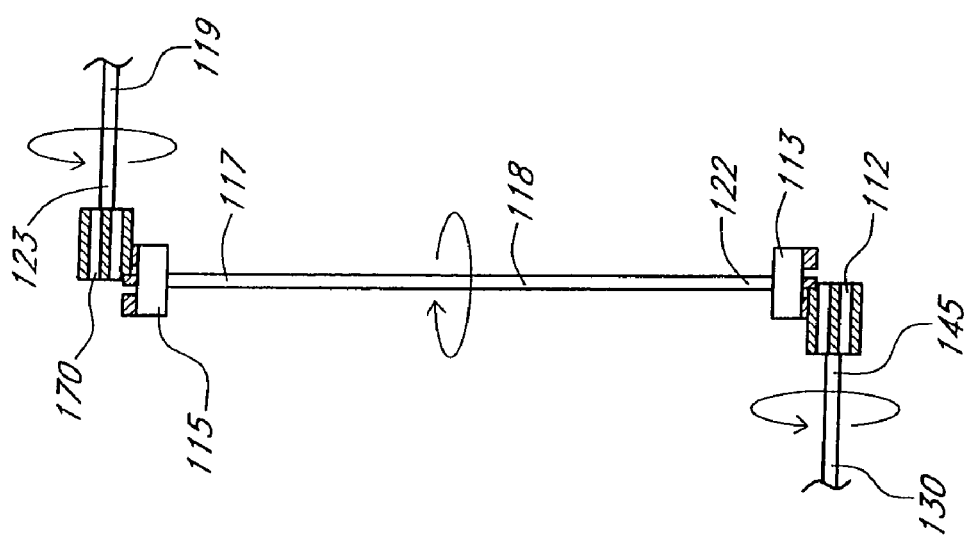
FIG. 7 is a detail view taken from FIG. 6, which illustrates internal components of the embodiment of the linked locked mechanism in greater detail.

Turning now to FIG. 7, one embodiment of the pivot rod 130, the first linkage 118, and the second linkage 119 are shown in detail. Several gears are included in this embodiment in order to interlock the pivot rod 130, the first linkage 118, and the second linkage 119. This is because gears can interlock two separate members such that rotation of one member causes rotation of the other member as is widely known in the art. In this embodiment, a first end 145 of the pivot rod 130 comprises a first gear 112. The first linkage 118 comprises a second gear 113 at its first end, and as shown, the second gear 113 interlocks with the first gear 112. Also, the first linkage 118 comprises a third gear 115 at its second end, and the second linkage 119 comprises fourth gear 170 at its first end 123. As shown, the fourth gear 170 of the second linkage 119 interlocks with the third gear 115.

As such, when the user of the RV 110a supplies an input signal through the central actuator 160, the second linkage 119 rotates about its axis, and the fourth gear 170 begins to rotate about the axis of the second linkage 119 as well. Rotation of the fourth gear 170 causes the third gear 115 and the second gear 113 of the first linkage 118 to rotate about the axis of the first linkage 118. Rotation of the second gear 113 causes the first gear 168 of the pivot rod 130 to rotate about the axis of the pivot rod 130, and this ultimately causes the rotation of the cams 132 about the axis of the pivot rod 130. As will be described below, rotation of the cams 132 causes the plurality of bolts 134 on multiple storage area doors 120 to move between their respective locked and unlocked configurations.

Turning now to FIG. 8A, FIG. 8B, and FIG. 8C, a cross section of the typical securing member 169 of the locking mechanism 125 of FIG. 6 is shown. As shown, the securing members 169 of this embodiment reside in the channel 146 of the wall 108a and the strike 136 similar to the embodiment shown in FIG. 5A, FIG. 5B, and FIG. 5C.

As shown, the cam 132 is oblong so as to define a major axis 143 and a minor axis 144, and the pivot rod 130 is rigidly attached to the cam 132 such that rotation of the pivot rod 130 will cause the cam 132 to rotate in tandem. As shown in FIG. 8A, one orientation of the pivot rod 130 causes the major axis 143 of the cam 132 to point in the vertical direction substantially. In such an orientation, the cam 132 pushes upward on the bolt 134 and moves the top end 155 of the bolt 134 into the strike 136. As such, the storage area door 120a is inhibited from moving from its closed position to its open position because as it moves, the top end 155 of the bolt 134 interferes with the flanges 152a, 152b and the first edge 187 of the storage area door 120a.

As shown in FIG. 8B and FIG. 8C, another orientation of the pivot rod 130 causes the minor axis 144 to point in the vertical direction substantially. In this orientation, the vertical profile of the cam 132 is reduced, allowing the bolt 134 to drop into the channel 146, leaving the storage area door 120a free to move between its open and closed positions.

In one embodiment, the locking mechanism 125 comprises a spring 150 having a first end 178 and a second end 179. The spring 150 is widely known for exerting a reactive force when one of its ends is displaced with respect to its other end. The first end 178 of the spring 150 is coupled to the bolt 134 and the second end 179 of the spring 150 is coupled to the wall 108a. More specifically, the spring 150 is placed over the cylindrical bolt 134, and the first end 178 of the spring 150 is retained by a first spring seat 126, a short cylinder attached to the bottom end 156 of the bolt 134 having a diameter larger than the diameter of the spring 150. The second end 179 of the spring 150 is retained by a second spring seat 127, a thin ridge of material attached to the first and second flanges 142, 180 extending far enough into the channel 146 to interfere with the second end 179 of the spring 150. The spring 150 preferably biases the bolt 134 downward toward the cam 132. Preferably, the force of the spring 150 sufficiently inhibits the bolt 134 from moving upward and entering the strike 136 when the cam 132 is positioned such that its minor axis 144 is positioned vertically. Advantageously, the bolt 134 is unlikely to inadvertently interfere with the storage area door 120a when the bolt 134 is in the unlocked configuration.

It is understood that the cross sections of the securing members 169 shown in FIG. 8A, FIG. 8B, and FIG. 8C are typical of all of the securing members 169 included in this embodiment of the locking mechanism 125. Thus, it is understood that all of the securing members 169 function in substantially the same manner. As stated, the pivot rod 130 is coupled to the plurality of cams 132 included in this locking mechanism 125, and the pivot rod 130 is also indirectly coupled to the central actuator 160. As such, shifting of the lever 161 causes the pivot rod 130 to rotate which causes the cams 132 to rotate since the pivot rod 130 is coupled to the plurality of cams 132. The rotation of the cams 132 causes all of the bolts 134 to shift, and thus, multiple storage area doors 120a can be locked or unlocked with a single shift of the lever 161.

It is understood that the embodiment of the locking mechanism 125 shown in FIG. 6 through FIG. 8C possess essentially the same advantages as the embodiment of the locking mechanism 125 shown in FIG. 4 through FIG. 5C. Namely, both embodiments of the locking mechanism 125 offer an added convenience to the user of the RV 100a because the locking mechanism 125 advantageously eliminates the inconvenience associated with having to lock or unlock multiple storage area doors 125. Also, both embodiments of the locking mechanism 125 can comprise a central actuator 160 that is positioned within the internal living space 110a of the RV 100a. Such placement advantageously limits the user's exposure to inclement weather and it also facilitates locking or unlocking of the storage area doors 120a when it is dark outside the RV 100a.

Figure 9:
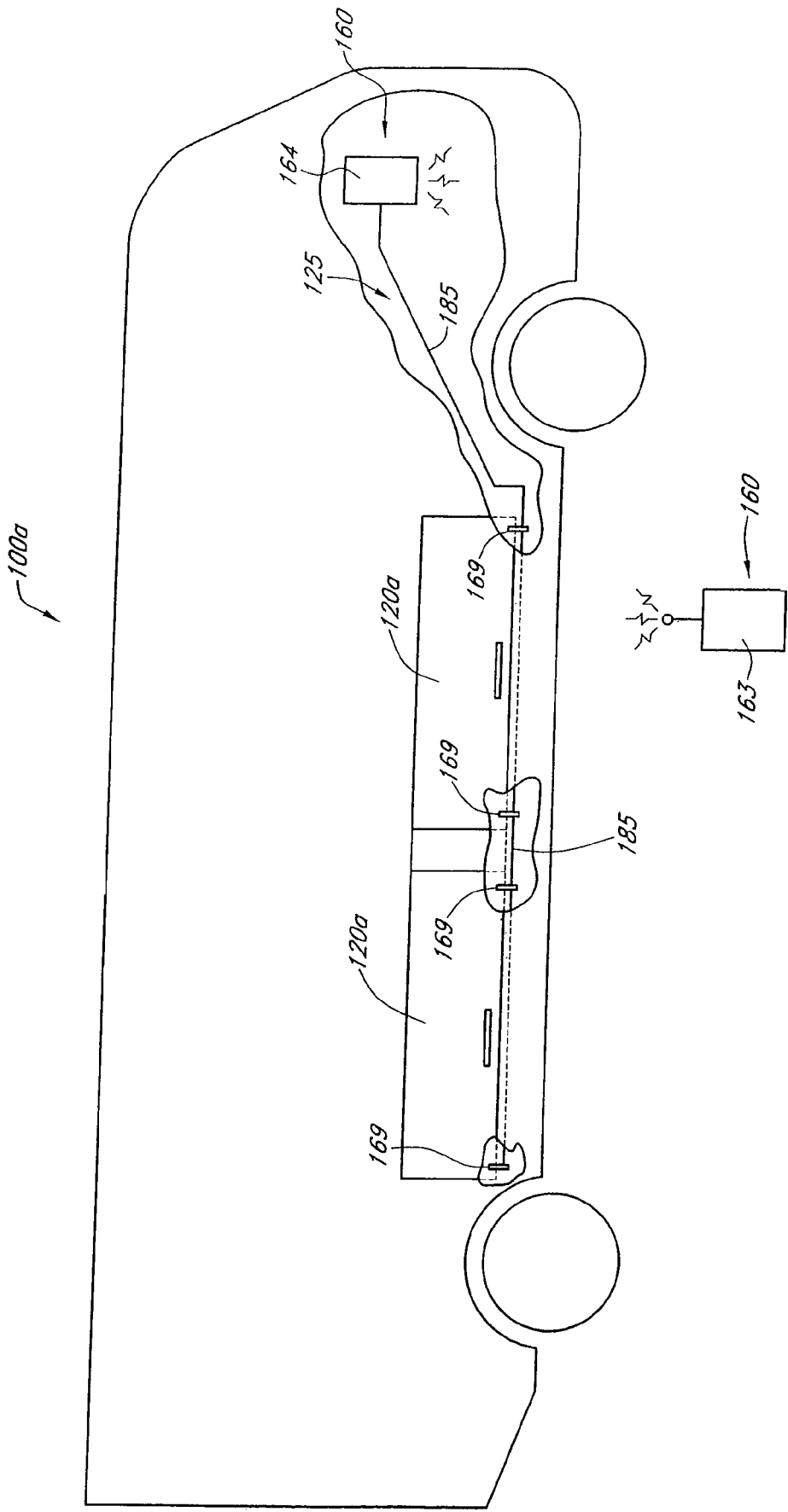
FIG. 9 is a detail view of the RV comprising a motorhome, which illustrates internal components of another embodiment of a locking mechanism.

Turning now to FIG. 9, another embodiment of the locking mechanism 125 is shown. This embodiment specifically illustrates an alternative central actuator 160. As shown, the central actuator 160 comprises a transmitter 163 and a receiver 164.

In one embodiment, the transmitter 163 is a small portable unit comprising components, such as buttons or dials, which can be physically manipulated by a user (not shown). Once manipulated, the transmitter 163 emits a signal into the air and that signal is communicated to the receiver 164. In one embodiment, the transmitter 163 emits RF signals.

Once the receiver 164 receives the signal from the transmitter 163, the receiver 164 translates that signal into an electrical, pneumatic, hydraulic, or mechanical signal, which is then sent through the transmission member 185 to the securing members 169. That electrical, pneumatic, hydraulic, or mechanical signal ultimately shifts the securing members 169 between their respective locked and unlocked configurations as described above in relation to the embodiments shown in FIG. 4 through FIG. 8C. In one embodiment, the transmitter 163 emits a signal at a first frequency, which ultimately causes the locking of the storage area doors 120a. Likewise, the transmitter 163 emits a signal at a second frequency, which ultimately causes the unlocking of the storage area doors 120a.

As stated, the transmitter 163 is a small, portable unit, and the user can take the transmitter 163 outside the RV 100a. As such, the user can lock or unlock the storage area doors 120a from anywhere near the RV 100a depending only on the ability of the signals to be received by the receiver 164. Advantageously, this embodiment of the locking mechanism 125 allows the user to lock or unlock the storage area doors 120a while moving about or around the RV 100a. For instance, the user may want to unlock or lock the storage area doors 120a when the user is standing outside the RV 100a. Advantageously, this embodiment of the locking mechanism 125 facilitates this desire.

Although embodiments of the locking mechanism 125 are shown above as comprising mainly electrical, pneumatic, hydraulic, or mechanical components, it should be noted that various other embodiments of the locking mechanism 125 could comprise a combination of hydraulic, electrical, pneumatic, or mechanical elements without departing from the spirit of the invention. Furthermore, the various embodiments of the locking mechanism described above are configured for baggage doors that are hinged along the top edges such that the doors swing upward to open. The locks are positioned adjacent the bottom edges of the doors so as to provide bottom sealing baggage doors. It will be appreciated that the locking mechanisms disclosed herein may be adapted to other types of doors by one of ordinary skill in the art without departing from the spirit of the invention.

Figure 10:
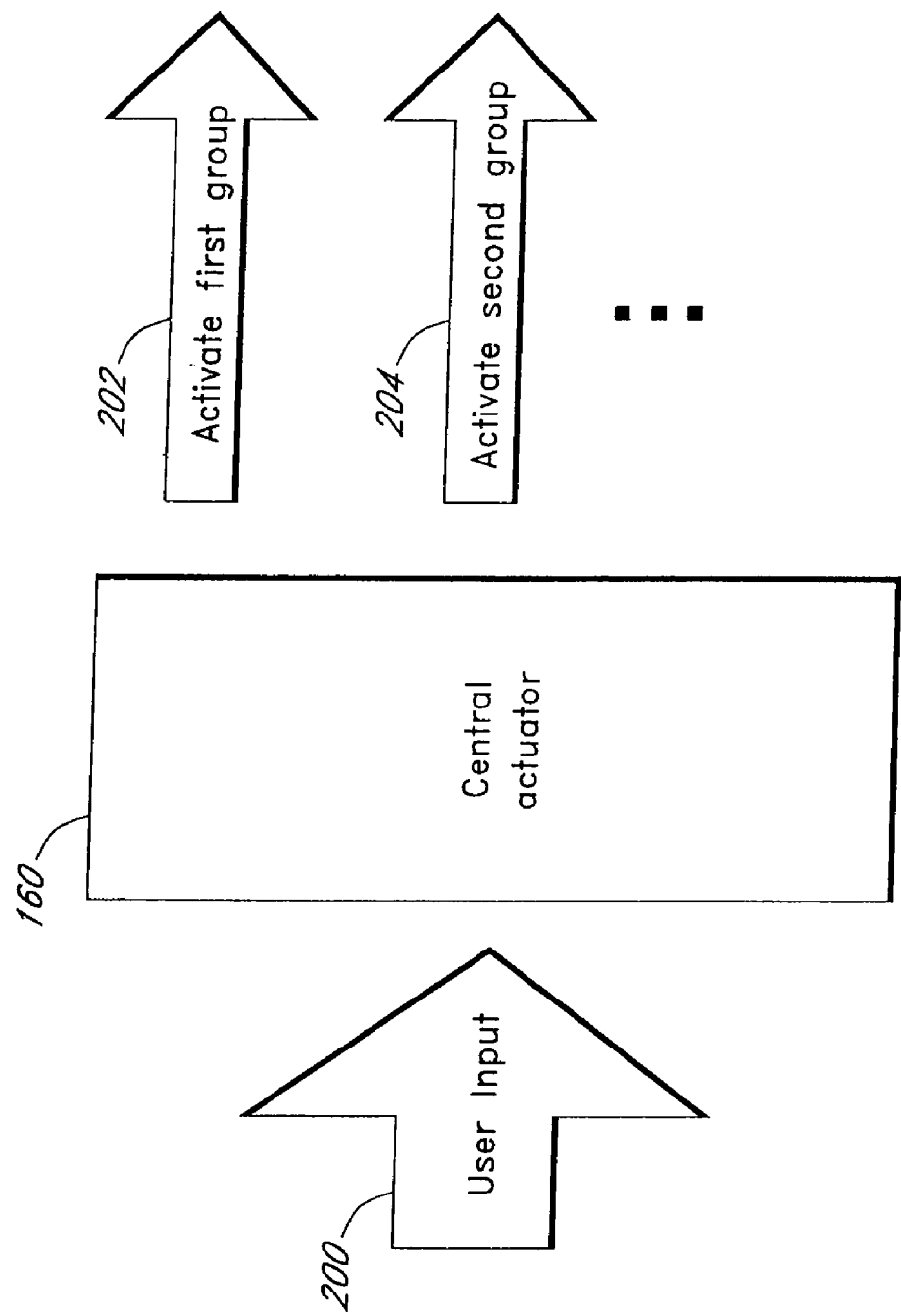
FIG. 10 is a functional schematic diagram illustrating how the locking mechanism can be adapted to permit activation of selected group(s) of locks.

FIG. 10 illustrates a functional schematic diagram of one possible alternate embodiment of the locking system described above. In particular, the central actuator 160 (FIGS. 4, 6, 9) is adapted so as to permit activation of selected group(s) of locks among the plurality of locks that secure the plurality of doors on the RV. A user input 200 is received by the activation device 160, and based on the input 200, the activation device 160 can activate a first group of locks 202, a second group of locks 204, and so on, or combinations thereof. As an example, the first group may include the main door of the RV, the second group may include all the external baggage doors, and a third group may include access doors that include by way of example, a generator hood, an engine compartment door, and a fuel filler cover. In another example, the first group may include doors with greater importance in security and the second group may include doors with lesser importance in security. It will be appreciated that the activation device 160 may be configured in any number of ways to permit selective activations of locks and doors grouped logically without departing from the spirit of the invention.

For the various embodiments of the locking systems described above in reference to FIGS. 4, 6, 9, the user input 200 may comprise different buttons, switches, levers, signals or the like for activating different groups. In one embodiment, the user input 200 is achieved by a numeric keypad wherein the user inputs a code to activate one or more of the locking/unlocking functions described above.

Alternatively, the keypad, buttons, switches, levers, signals or the like may be configured to perform different functions when activated in different manners. For example, the remote transmitter 163 in FIG. 9 may be configured in a similar manner as many transmitters used for passenger automobiles, where a first press of an unlock button unlocks the driver's door and a second press of the same button unlocks the rest of the doors. Thus for example, the remote transmitter 163 and the activation device 160 may be configured such that a first press of a button unlocks the main door of the RV and a second press of the same button unlocks all the baggage doors.

Figure 12:
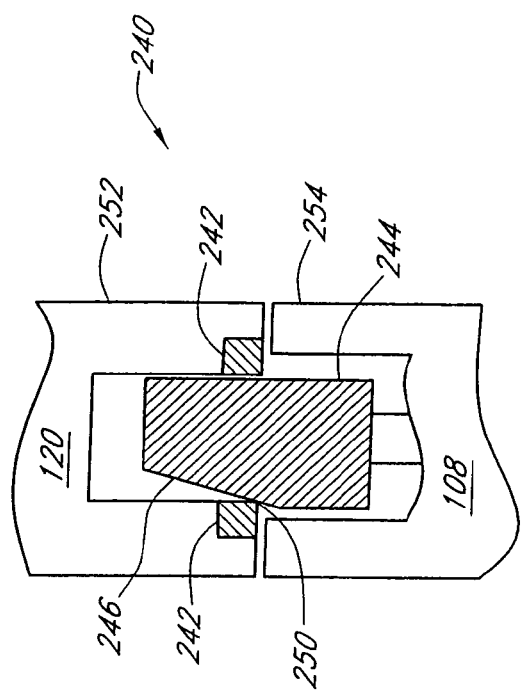
FIG. 12 illustrates another embodiment of the locking member wherein the bolt is tapered such that when it engages the strike, the tapered edge of the bolt urges the door to fit flush with the wall.
Figure 11:
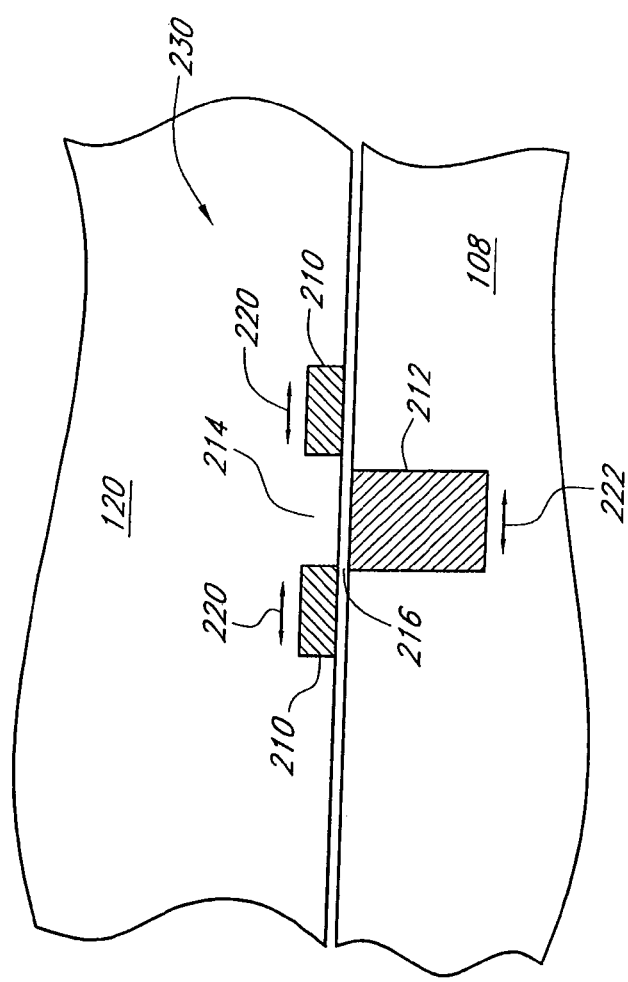
FIG. 11 illustrates one embodiment of a locking member wherein strike and bolt are adjustable relative to each other so as to permit optimized alignment.

FIGS. 11 and 12 illustrate two possible configurations of the bolt and the strike employed in the access door described above. In particular, the two configurations permit the door to be closed and locked relative to the wall such that the door aligns with the wall in a desirable manner.

FIG. 11 illustrates a sectional view of the door and the wall when facing the door. The door 120 is in a closed orientation relative to the wall 103. In one embodiment, a locking member 230 comprises a strike 210 that defines an opening 214 sized to receive a bolt 212 when in the locked configuration. The bolt 212 is shown to be misaligned with the strike 210, such that the bolt 212 would undesirably engage the strike at location 216. Such misalignment situation may arise from manufacturing errors or tolerances, and one of the negative consequences is the difficulty insertion of the bolt 212 into the recess 214 defined by the strike 210. If the bolt is somehow forced into the strike, the door may be in a strained configuration relative to the wall.

To accommodate such misalignments, the locking member 230 is adapted so as to permit adjustment of the strike 210 as shown by arrow 220. The bolt 212 may also be adapted to be adjusted as shown by arrow 222. The adjustment of the strike 210 may be achieved, for example, by providing a margin at the securing points (e.g., slotted screw holes in the strike) of the strike to the door (not shown). The bolt 212 may be adapted to be adjusted in a similar manner. Furthermore, the strike and/or the bolt may be adapted to be adjustable along a direction perpendicular to the direction indicated by arrows 220 and 222.

FIG. 12 illustrates a side cross sectional view of a locking member 240 comprising a strike 242 mounted on the door 120, and a bolt 244 mounted on the wall. The bolt 244 comprises a tapered side 246 dimensioned such that when the bolt 244 extends into the strike 242, a portion of the tapered side 246 engages a portion of the strike 242 at location 250. In one embodiment, the tapered side 246 is formed on the interior side (left side in the Figure) such that when the bolt engages the strike (at location 250), the bolt 246 urges the strike 242 (and hence the door) inward for an improved sealing of the door 120. In the Figure, the improved sealing of the door 102 is exemplified by a flush alignment of the exterior surfaces 252 and 254 of the door and wall. It will be appreciated by one of ordinary skill in the art that such a flush fit of the door is advantageous not only for sealing function, but also for aesthetics of the door.

Although the foregoing description of the preferred embodiment of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the invention should not be limited to the foregoing discussions, but should be defined by the appended claims.

What is claimed is:

1. A recreational vehicle comprising:
   a frame mounted on wheels adapted to be rollaby moved over the ground;
   a housing comprising a plurality of walls built on the frame so as to define an interior living space having a bathroom and a bedroom wherein the housing further defines a plurality of storage spaces each having an access opening adjacent the exterior walls of the housing;
   a plurality of access doors positioned adjacent the outer wall of the housing adjacent the access openings of the plurality of storage spaces, wherein the plurality of access doors are hingeably attached to the housing so as to be movable between an open position, wherein access to the storage space is provided via the access opening, and a closed position wherein the storage space is secured from entry via the access opening;
   a locking system having a plurality of locking members and a central actuator, wherein the plurality of locking members engage with the plurality of access doors such that the plurality of locking members in a locked configuration lock the plurality of access doors into the closed position and in an unlocked configuration permit the plurality of access doors to be moved to an open position and wherein the central actuator is mounted within the housing and is coupled to the plurality of locking members such that controlling of the central actuator results in the plurality of locking members moving between a locked and unlocked configuration;
   wherein each of the locking members comprises:
      a strike defined by the access door and a movable bolt mounted to the housing such that in the locked configuration a portion of the bolt engages the strike so as to prevent opening of the door and wherein in the unlocked configuration the bolt retracts from the strike so as to permit opening of the door; and
      a cam that is rotatably mounted to the housing such that the cam engages the bolt, wherein the cam being in a first orientation causes the bolt to be pushed into the strike for the locked configuration and wherein the cam being in a second orientation allows the bolt to retract from the strike for the unlocked configuration, wherein the rotation of the cam is mechanically actuated.

2. The recreational vehicle of claim 1, wherein the locking member further comprises a spring that couples the bolt to the housing such that the locked configuration corresponds to the spring being compressed, wherein during transition of the locking member into the unlocked configuration, the spring relaxes thereby facilitating the retraction of the bolt from the strike.

3. The recreational vehicle of claim 2, wherein the locking system further comprises a plurality of linkages and gears that interconnect the cam in each of the plurality of locking members to the central actuator so as to transmit mechanical output of the central actuator to the cams.

4. The recreational vehicle of claim 1, wherein the locking system further comprises a portable transmitter and a receiver wherein the receiver is connected to the central actuator and wherein a signal transmitted by the transmitter is received by the receiver and relayed to the central actuator as the control input.

5. The recreational vehicle of claim 4, wherein the signal is a lock signal.

6. The recreational vehicle of claim 5, wherein the signal is an unlock signal.

7. The recreational vehicle of claim 1, wherein the central actuator is configured to receive user input, and based on the user input, selectively activate one or more groups of locking members.

8. The recreational vehicle of claim 7, wherein the groups of locking members comprises a first group that includes a locking member for a main door, and a second group that includes locking members for the plurality of access doors.

9. The recreational vehicle of claim 1, wherein the recreational vehicle is a motorhome.

10. The recreational vehicle of claim 1, wherein the recreational vehicle is a trailer.

11. The recreational vehicle of claim 10, wherein the trailer is a fifth-wheel trailer.

12. The recreational vehicle of claim 1, wherein the relative orientation of the strike to the bolt is adjustable so as to accommodate misalignments.

13. The recreational vehicle of claim 1, wherein the bolt is tapered on one side such that when engaged with the strike, the bolt urges the door in a first direction.

14. The recreational vehicle of claim 13, wherein the taper is on the interior side such that the bolt urges the door inward when engaged with the strike.

15. A recreational vehicle comprising:
  a frame mounted on wheels adapted to be rollaby moved over the ground;
  a housing comprising a plurality of walls built on the frame so as to define an interior living space having a bathroom and a bedroom wherein the housing further defines a plurality of storage spaces each having an access opening adjacent the exterior walls of the housing;
  a plurality of access doors positioned adjacent the outer wall of the housing adjacent the access openings of the plurality of storage spaces, wherein the plurality of access doors are hingeably attached to the housing so as to be movable between an open position wherein access to the storage space is provided via the access opening, and a closed position wherein the storage space is secured from entry via the access opening and wherein the plurality of access doors are logically grouped into one or more groups; and
  a locking system having a plurality of locking members controlled by a central actuator, wherein the plurality of locking members are grouped according to the one or more logical groups of the access doors such that controlling of the central actuator results in a selected group of locking members associated with a selected group of access doors moving between a locked and unlocked configuration, wherein the selected group of locking members engage with the selected group of access doors such that the selected group of locking members in a locked configuration lock the selected group of access doors into the closed position and in an unlocked configuration permit the selected group of access doors to be moved to an open position, and wherein the central actuator is mounted within the housing and is coupled to the one or more groups of locking members;
  wherein the access doors include a main door to the interior living space, a plurality of baggage compartment doors, and one or more utility access doors, and wherein wherein all the access doors are logically grouped into a single group or according to functionality of the doors such that the central actuator is able to lock and unlock all the access doors simultaneously or according to the functionality of the doors.

16. The recreational vehicle of claim 15, wherein the access doors are logically grouped into first, second, and third groups, wherein the first group comprises the main door, the second group comprises the baggage compartment doors, and the third group comprises the utility access doors.

17. The recreational vehicle of claim 15, wherein the access doors are logically grouped according to desired level of security.

18. The recreational vehicle of claim 15, wherein each of the locking members comprises:
  a strike defined by the access door and a movable bolt mounted to the housing such that in the locked configuration a portion of the bolt engages the strike so as to prevent opening of the door and wherein in the unlocked configuration the bolt retracts from the strike so as to permit opening of the door; and
  a cam that is rotatably mounted to the housing such that the cam engages the bolt, wherein the cam being in a first orientation causes the bolt to be pushed into the strike for the locked configuration and wherein the cam being in a second orientation allows the bolt to retract from the strike for the unlocked configuration, wherein the rotation of the cam is mechanically actuated.

19. The recreational vehicle of claim 18, wherein the locking member further comprises a spring that couples the bolt to the housing such that the locked configuration corresponds to the spring being compressed, wherein during transition of the locking member into the unlocked configuration, the spring relaxes thereby facilitating the retraction of the bolt from the strike.

20. The recreational vehicle of claim 19, wherein the locking system further comprises a plurality of linkages and gears that interconnect the cam in each of the plurality of locking members to the central actuator so as to transmit mechanical output of the central actuator to the cams.

21. The recreational vehicle of claim 18, wherein the locking system further comprises a portable transmitter and a receiver wherein the receiver is connected to the central actuator and wherein a signal transmitted by the transmitter is received by the receiver and relayed to the central actuator as the control input.

22. The recreational vehicle of claim 21, wherein the signal is a lock signal.

23. The recreational vehicle of claim 18, wherein the relative orientation of the strike to the bolt is adjustable so as to accommodate misalignments.

24. The recreational vehicle of claim 18, wherein the bolt is tapered on one side such that when engaged with the strike, the bolt urges the door in a first direction.

25. The recreational vehicle of claim 24, wherein the taper is on the interior side such that the bolt urges the door inward when engaged with the strike.

26. The recreational vehicle of claim 15, wherein the signal is an unlock signal.

27. The recreational vehicle of claim 15, wherein the recreational vehicle is a motorhome.

28. The recreational vehicle of claim 15, wherein the recreational vehicle is a trailer.

29. The recreational vehicle of claim 28, wherein the trailer is a fifth wheel trailer.

* * * * *

UNITED STATES PATENT AND TRADEMARK OFFICE
CERTIFICATE OF CORRECTION

| | |
|---|---|
| PATENT NO. | : 7,021,690 B2 |
| APPLICATION NO. | : 10/936787 |
| DATED | : April 4, 2006 |
| INVENTOR(S) | : Johnnie R. Crean |

It is certified that error appears in the above-identified patent and that said Letters Patent is hereby corrected as shown below:

At Column 6, Line 64, please delete "10a" and insert therefore, --110a--.

At Column 17, Line 59, after "wherein" please delete "wherein".

Signed and Sealed this

Twenty-eighth Day of November, 2006

JON W. DUDAS
*Director of the United States Patent and Trademark Office*